(12) United States Patent
Yoshida et al.

(10) Patent No.: US 11,960,499 B2
(45) Date of Patent: Apr. 16, 2024

(54) SALES DATA PROCESSING APPARATUS, METHOD, AND MEDIUM STORING PROGRAM FOR SALES PREDICTION

(71) Applicant: NIPPON TELEGRAPH AND TELEPHONE CORPORATION, Tokyo (JP)

(72) Inventors: Manabu Yoshida, Musashino (JP); Miyuki Imada, Musashino (JP); Ippei Shake, Musashino (JP); Akinori Fujino, Soraku-gun (JP); Hisashi Kurasawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 470 days.

(21) Appl. No.: 16/969,299

(22) PCT Filed: Jan. 18, 2019

(86) PCT No.: PCT/JP2019/001515
§ 371 (c)(1),
(2) Date: Aug. 12, 2020

(87) PCT Pub. No.: WO2019/159602
PCT Pub. Date: Aug. 22, 2019

(65) Prior Publication Data
US 2021/0042318 A1 Feb. 11, 2021

(30) Foreign Application Priority Data
Feb. 15, 2018 (JP) .................................. 2018-025101

(51) Int. Cl.
*G06F 17/18* (2006.01)
*G06F 16/25* (2019.01)
(Continued)

(52) U.S. Cl.
CPC ............ *G06F 16/258* (2019.01); *G06F 17/18* (2013.01); *G06Q 10/105* (2013.01); *G06Q 30/0201* (2013.01); *G06N 20/00* (2019.01)

(58) Field of Classification Search
CPC ..... G06F 16/258; G06F 17/18; G06Q 10/105; G06Q 30/0201; G06Q 30/02; G06N 20/00
See application file for complete search history.

(56) References Cited

U.S. PATENT DOCUMENTS

2009/0132347 A1* 5/2009 Anderson .............. G06Q 30/02
705/30
2012/0239599 A1 9/2012 Matsumoto
(Continued)

FOREIGN PATENT DOCUMENTS

| JP | 2012194894 A | 10/2012 |
|---|---|---|
| JP | 201797317 A | 6/2017 |

OTHER PUBLICATIONS

Jian et al., Prediction of E-shopper's Behavior Changes Based on Purchase Sequences, 2010 International Conference on Artificial Intelligence and Computational Intelligence, pp. 152-156, (Year: 2010).*

(Continued)

*Primary Examiner* — Cheyne D Ly
(74) *Attorney, Agent, or Firm* — Harness, Dickey & Pierce, P.L.C.

(57) ABSTRACT

A data processing method according to an embodiment acquires data including a plurality of records, divides the data based on external condition identification information such as a user ID to generate data sets Di for respective external conditions, divides each of the data sets Di based on label information indicating whether the record corresponds to a positive label indicating that a predetermined event has occurred or a negative label indicating that the predeter- (Continued)

mined event has not occurred to generate two data sets Di+ and Di− for the respective label information, generates difference data for a combination of a record included in one data set of the two data sets and a record included in the other data set, combines the generated difference data to generate integrated data Dnew, performs statistical analysis using Dnew, and outputs a result of performing the statistical analysis.

12 Claims, 4 Drawing Sheets

(51) Int. Cl.
    *G06Q 10/105*    (2023.01)
    *G06Q 30/0201*    (2023.01)
    *G06N 20/00*    (2019.01)

(56) References Cited

U.S. PATENT DOCUMENTS

2015/0170175 A1*   6/2015   Zhang ................ H04M 15/851
                                                            705/7.33
2017/0140300 A1   5/2017   Funakoshi et al.
2018/0350007 A1*  12/2018   Chen .................... G06Q 40/123

OTHER PUBLICATIONS

Yang et al., Analysis of Personal Preferences Influencing on Buyer's Behavior under the B2C and C2C Mode, 2011 Fourth International Conference on Business Intelligence and Financial Engineering, pp. 215-219 (Year: 2011).*

Park et al., From Accuracy to Diversity in Product Recommendations: Relationship Between Diversity and Customer Retention, International Journal of Electronic Commerce / Winter 2013-14, vol. 18, No. 2, pp. 51-71. (Year: 2014).*

Yada et al. Data Mining for Marketing Saturday, Apr. 30, 2011, SIAM International Workshop on Data Mining for Marketing held in conjunction with the 2011 SIAM International Conference on Data Mining, pp. 1-80. (Year: 2011).*

Nitesh V. Chawla, et al. "SMOTE: Synthetic Minority Oversampling Technique", Journal of Artificial Intelligence Research 16 (2002) 321-357.

International Search Report of the International Searching Authority (English and Japanese), issued in PCT/JP2019/001515, dated Mar. 12, 2019; ISA/JP.

* cited by examiner

| Customer ID | Sales result | Sales representative ID | Customer attribute (Size of staff) | Customer attribute (Type of business) | ... |
|---|---|---|---|---|---|
| AAA | Sold | A | Small | Kindergarten | ... |
| BBB | Not sold | A | Large | Mass merchandiser | ... |
| CCC | Sold | B | Medium | Hospital | ... |
| DDD | Not sold | A | Small | Elementary school | ... |
| EEE | Not sold | B | Medium | Hair salon | ... |
| FFF | Not sold | B | Large | University | ... |
| GGG | Not sold | B | Large | Convenience store | ... |
| ... | ... | ... | ... | ... | ... |

F I G. 4

SALES DATA PROCESSING APPARATUS, METHOD, AND MEDIUM STORING PROGRAM FOR SALES PREDICTION

CROSS-REFERENCE TO RELATED APPLICATIONS

This is a U.S. national phase application under 35 USC 371 of international application PCT/JP2019/001515, (not published in English) filed Jan. 18, 2019, which claims priority to Japanese patent application No. 2018-025101, filed on Feb. 15, 2018. The entire disclosures of the above applications are incorporated herein by reference.

FIELD

The present invention relates generally to a data processing apparatus that performs statistical analysis based on acquired data, a method, and a medium storing a program.

BACKGROUND

In recent years, various and large amounts of data have been accumulated, such as a purchase history of Internet shopping, a use history of prepaid cards, and a business sales history of a certain commodity. Statistical models are also derived for the purpose of improving sales and reducing sales costs by utilizing the accumulated data.

With respect to data related to purchase behavior and sales behavior by business activity, data indicating merchandise was "purchased" or "sold" is often rare with respect to data indicating merchandise was "not purchased" or "not sold". As described above, in the data indicating "purchased/not purchased" or "sold/unsold", since two kinds of labels (hereinafter, "purchased" is referred to as a positive label and "not purchased" is referred to as a negative label) serving as objective variables in a statistical model are imbalanced, there is a problem wherein the rare positive label cannot be accurately predicted when deriving the statistical model.

As a technique of solving this problem, a method of making the number of samples uniform by sampling has been reported (see, for example, Nitesh V. Chawla, et al. "SMOTE: Synthetic Minority Over-sampling Technique", Journal of Artificial Intelligence Research 16 (2002) 321-357).

SUMMARY

Here, it is generally considered that factors such as behavior peculiar to a person who buys and sells, and factors specific to merchandise to be bought and sold affect the above-described results of buying and selling. However, since these factors are difficult to express as data, most of them are not included in an accumulated data set as described above.

Therefore, there is a problem wherein factors such as behavior peculiar to a person who buys/sells and factors peculiar to merchandise to be bought/sold, which will possibly affect the result of buying/selling and the distinction between the positive label and the negative label, cannot be incorporated into the statistical model derived by utilizing the accumulated data.

The present invention has been made in view of the above circumstances, and an object of the present invention is to provide a technique for performing statistical analysis on acquired data in consideration of potential features that affect an occurrence of a predetermined event.

In order to solve the above problem, a first aspect of the present invention is in a data processing apparatus, comprising: a processor; and a memory that stores instructions for operating the processor, wherein the processor is configured to acquire data including a plurality of records; divide the records of the acquired data based on external condition identification information included in each of the records, the external condition identification information being for identifying which one of external conditions serving as potential features that affect an occurrence of a predetermined event an external condition according to the record is, to generate data sets for the respective external conditions; divide, for each of the generated data sets for the respective external conditions, the records included in the data set based on label information included in each of the records, the label information indicating whether the record corresponds to a positive label indicating that the predetermined event has occurred or a negative label indicating that the predetermined event has not occurred, to generate two data sets for the respective label information; generate difference data for a combination of a record included in one data set of the two data sets for the respective label information and a record included in the other data set; perform statistical analysis using the generated difference data; and output a result of performing the statistical analysis.

According to a second aspect of the present invention, in the above first aspect, each of the plurality of records of the acquired data further includes information corresponding to a value of a predetermined feature quantity; the difference data includes, for the combination between a record included in one data set of the two data sets for the respective label information and a record included in the other data set, a difference between values for feature quantities of the predetermined feature quantity according to the respective records and a difference between values indicating whether or not the predetermined event has occurred according to the respective records; and performing the statistical analysis includes calculating a regression coefficient vector according to a model for calculating a score value indicating a likelihood of an occurrence of the predetermined event by using the difference between values for feature quantities of the predetermined feature quantity included in the difference data as an element of a feature vector and using the difference between values indicating whether or not the predetermined event has occurred included in the difference data as a label indicating whether or not the predetermined event has occurred according to the model.

According to a third aspect of the present invention, in the above second aspect, calculating the regression coefficient vector according to the model includes calculating the regression coefficient vector so that an area under the curve (AUC) value based on a receiver operating characteristic (ROC) curve according to the model is maximized.

According to a fourth aspect of the present invention, in the above first aspect, each of the plurality of records of the acquired data further includes a value of acceleration data of a mobile device carried by a user as a value of a predetermined feature quantity and an ID for identifying the user as the external condition identification information; the positive label indicating that the predetermined event has occurred indicates that the user has passed through a step; the negative label indicating that the predetermined event has not occurred indicates that the user has not passed through the step; the difference data includes a difference between values of the acceleration data according to the respective records and a difference between values indicating whether or not the user has passed through the step according to the respective records; performing the statistical analysis includes calculating a regression coefficient vector according to a model for calculating a score value indicating whether or not the user has passed through the step by using the difference between values of the acceleration data included in the difference data as an element of a feature vector and using the difference between values indicating whether or not the user has passed through the step as a label indicating whether or not the user has passed through the step according to the model.

According to a fifth aspect of the present invention, in the above fourth aspect, calculating the regression coefficient vector according to the model includes calculating the regression coefficient vector so that an area under the curve (AUC) value based on a receiver operating characteristic (ROC) curve according to the model is maximized.

According to the first aspect of the present invention, data including a plurality of records is acquired, and the records of the acquired data are divided based on external condition identification information for identifying which one of external conditions as potential features that affect an occurrence of a predetermined event an external condition according to the record is, thereby generating data sets for the above respective external conditions. For each of the generated data sets for the respective external conditions, records included in the data set are divided based on label information indicating whether the record corresponds to a positive label indicating that the predetermined event has occurred or a negative label indicating that the predetermined event has not occurred, thereby generating two data sets for the respective label information, and difference data is generated for a combination of records included in the two respective data sets for the respective label information. Statistical analysis is performed using the generated difference data, and a result of performing the statistical analysis is output.

According to the second aspect of the present invention, each of the plurality of records further includes information corresponding to a value of a predetermined feature quantity, and as the above difference data, for the combination between the records included in the two respective data sets for the respective label information, difference data including a difference between values for respective feature quantities of the predetermined feature quantity according to the respective records and a difference between values indicating whether or not the predetermined event has occurred according to the respective records is generated. Then, as the above statistical analysis, a regression coefficient vector according to a model for calculating a score value indicating a likelihood of an occurrence of the above predetermined event is calculated by using the difference between values for respective feature quantities of the predetermined feature quantity included in the above generated difference data as an element of a feature vector and the difference between values indicating whether or not the predetermined event has occurred included in the above difference data as a label indicating whether or not the predetermined event has occurred according to the model.

In the above-described first and second aspects, the difference data to be used for the statistical analysis is generated for the combination of the records included in the two respective data sets for the respective label information. Thus, it is possible to make combinations when performing pairwise learning substantially equal in condition; therefore, it is possible to solve the problem wherein in a case where the positive label and the negative label are imbalanced, one of the labels that is rare cannot be predicted with high accuracy. The two data sets for the respective label information are generated by dividing the record set for each external condition in which records having the same external condition are collected. As described above, since the difference data is generated for each record set having the same external condition, the generated difference data can be one from which an influence of a potential feature that affects an occurrence of a predetermined event is eliminated. Furthermore, since the difference data can be generated for various combinations between the records included in the two respective data sets for the respective label information, it is possible to secure a sufficient amount of data for performing statistical analysis even in a case where sufficient explanatory variables cannot be collected as samples.

According to the third and fifth aspects of the present invention, the above regression coefficient vector is calculated so that an AUC value based on an ROC curve according to a model for calculating a score value indicating a likelihood of an occurrence of a predetermined event is maximized.

The AUC value is an evaluation index based on an ROC curve, which is commonly used to express the precision of binary classification, and the larger the AUC value, the more correctly a content is ranked by score in the order from a positive example to a negative example. The technique described in the document of Nitesh et al. cited above has a problem of a difficulty in optimizing the AUC value based on the ROC curve. However, in the above third aspect, in addition to the fact that the statistical analysis can be performed by making the number of samples of data of the positive label equal to that of data of the negative label, an AUC value according to the model derived by the statistical analysis can be optimized.

According to the fourth aspect of the present invention, in the above first aspect, each of the plurality of records further includes a value of acceleration data of a mobile device carried by a user as a value of a predetermined feature quantity, and also includes an ID for identifying the user as the above external condition identification information. Thus, a plurality of records are divided based on the IDs for identifying users, and a data set is generated for each of the IDs for identifying users. In the fourth aspect, the positive label indicating that the predetermined event has occurred indicates that the user has passed through a step, and the negative label indicating that the predetermined event has not occurred indicates that the user has not passed through the step. Thereby, the data set for each of the IDs for identifying users is further divided based on the label information, thereby generating two data sets for the respective label information. Then, the above difference data is generated for a combination of the records included in the two respective data sets for the respective label information. The difference data includes a difference between the values of the acceleration data and a difference between the values indicating whether or not the user has passed through the step. Then, by performing statistical analysis using the difference data, a regression coefficient vector according to a model for calculating a score value indicating whether or not the user has passed through the step is calculated using the above difference between the values of the acceleration data included in the difference data as an element of a feature vector and the above difference between the values indicating whether or not the user has passed through the step as a label.

Thus, even in a case where the users walk differently and the labels are imbalanced at a point where there is a large step and at a point where there is no large step, it is possible to generate difference data from which an influence of a potential feature that affects an occurrence of a predetermined event is eliminated by the above fourth aspect. Further, by using such difference data, it is possible to make combinations when performing pairwise learning substantially equal in condition, and it is possible to derive a statistical model for calculating a score of passing through a step while securing a data amount.

That is, according to the present invention, it is possible to provide a technique for statistically analyzing acquired data in consideration of a potential feature that affects an occurrence of a predetermined event.

BRIEF DESCRIPTION OF THE DRAWINGS

FIG. 4 is a diagram showing an example of business sales history data acquired by the controller unit.

BEST MODE FOR CARRYING OUT THE INVENTION

In the following, embodiments according to the present invention will be explained with reference to the accompanying drawings.

First Embodiment (Configuration)

Figure 1:
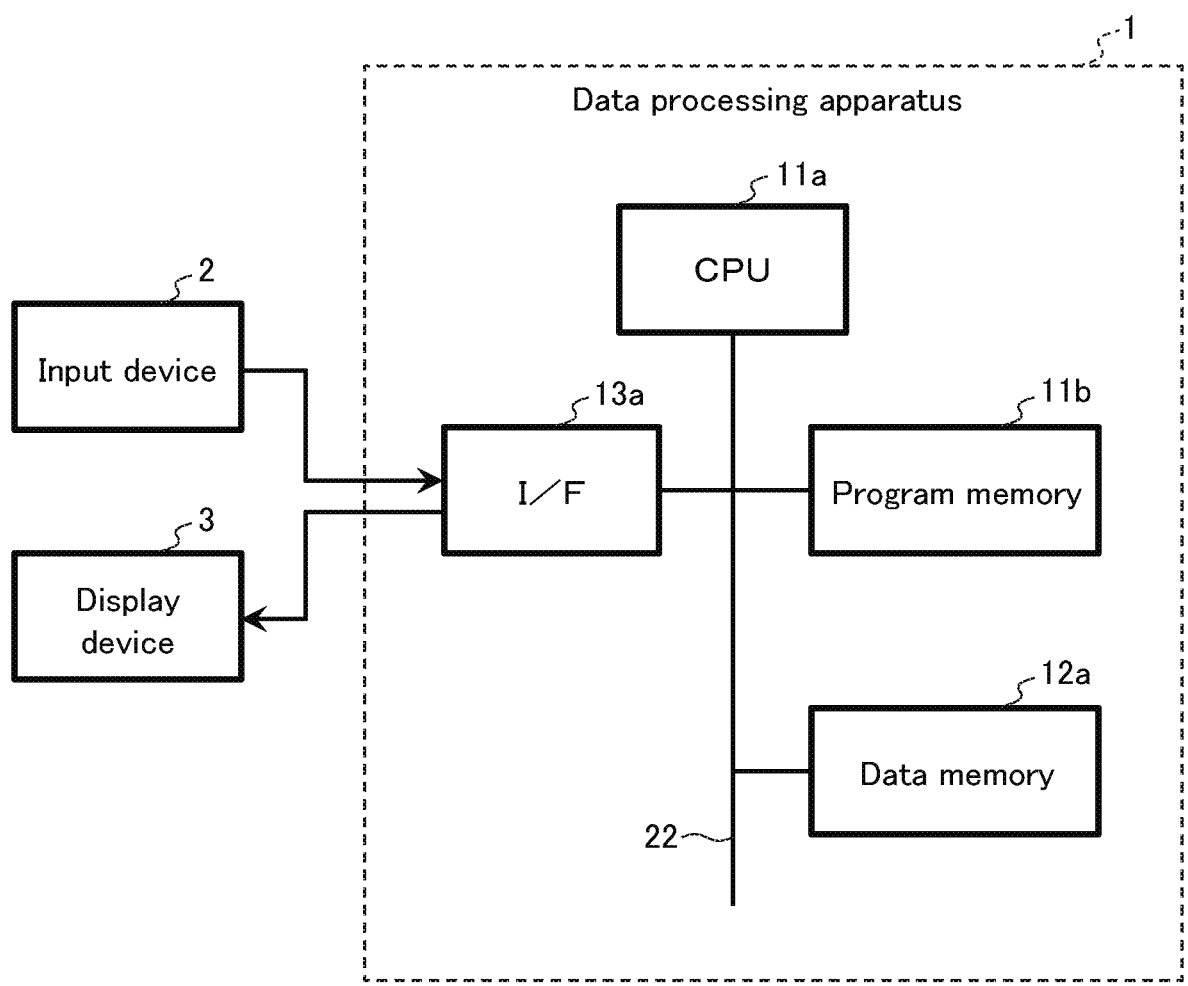
FIG. 1 is a block diagram showing a hardware configuration of a data processing apparatus according to a first embodiment of the present invention.

FIG. 1 is a block diagram showing an example of a hardware configuration of a data processing apparatus 1 according to a first embodiment of the present invention.

The data processing apparatus 1 includes a hardware processor 11a such as a central processing unit (CPU) as hardware, and a program memory lib, a data memory 12a, and an input/output interface (I/F) 13a are connected to the hardware processor 11a via a bus 22.

The I/F 13a includes, for example, one or more wired or wireless communication interfaces, and, for example, takes in data input to an input device 2 by an operator, and performs a process of outputting display data to a display device 3 to display the display data.

The program memory 11b uses, as a storage medium, for example, a nonvolatile memory that can be written and read at any time such as an HDD (Hard Disk Drive) or an SSD (Solid State Drive), or a nonvolatile memory such as a ROM, and stores a program necessary for executing various control processing according to the embodiment.

The data memory 12a includes, as a storage medium, for example, a combination of a nonvolatile memory that can be written and read at any time such as an HDD or an SSD and a volatile memory such as a RAM. Then, the data memory 12a is used to store various data acquired, generated, and calculated in the process of executing various processing according to the present embodiment.

The input device 2 receives a user input, and is, for example, a keyboard, a mouse, a touch screen, a button, a switch, etc.

The display device 3 presents information to a user, and is, for example, a liquid crystal display, an organic EL (Electro-Luminescence) display, etc. The display device 3 and the input device 2 may be integrally formed like a touch panel, for example.

Figure 2:
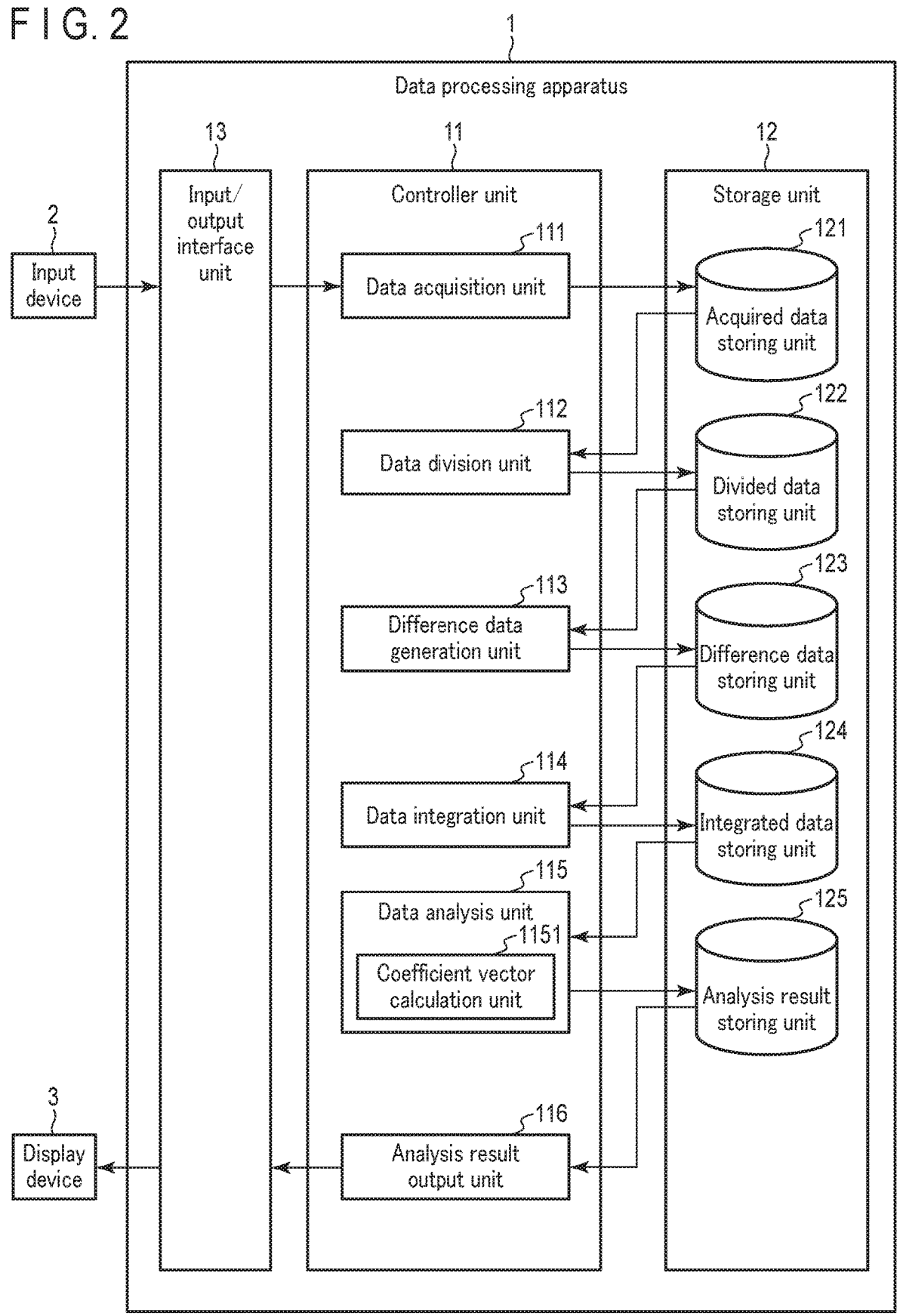
FIG. 2 is a block diagram showing a functional configuration of the data processing apparatus according to the first embodiment of the present invention.

FIG. 2 is a block diagram showing a functional configuration of the data processing apparatus 1 according to the first embodiment of the present invention. The data processing apparatus 1 can derive a statistical model by performing statistical analysis based on acquired data. In the process of deriving the statistical model, for example, a regression coefficient vector according to a model for calculating a score value indicating a likelihood of an occurrence of a predetermined event is calculated from a feature vector having a value of a predetermined feature quantity as an element.

The data processing apparatus 1 includes, as hardware, a controller unit 11, a storage unit 12 including the above data memory 12a, and an input/output interface unit 13 including the above I/F 13a.

The input/output interface unit 13 includes, for example, one or more wired or wireless communication interface units. The input/output interface unit 13 inputs, to the controller unit 11, data to be used when the data processing apparatus 1 performs statistical analysis, which is input by the input device 2 including a keyboard and a mouse, for example. Furthermore, the input/output interface unit 13 causes the display device 3 to display data output from the controller unit 11.

The storage unit 12 uses, as a storage medium, a nonvolatile memory that can be written and read at any time such as an HDD or an SSD, and includes an acquired data storing unit 121, a divided data storing unit 122, a difference data storing unit 123, an integrated data storing unit 124, and an analysis result storing unit 125 in order to realize the present embodiment.

The acquired data storing unit 121 is used to store data including a plurality of records, acquired from the input device 2.

The divided data storing unit 122 is used to store data sets generated by dividing the acquired data.

The difference data storing unit 123 is used to store difference data to be generated based on records included in each of the data sets generated by dividing the acquired data.

The integrated data storing unit 124 is used to store integrated data generated by integrating the above difference data and to be used when performing the above statistical analysis.

The analysis result storing unit 125 is used to store information on a result obtained by the above statistical analysis.

The controller unit 11 includes the above hardware processor 11a such as a CPU and the above program memory 11b, and includes a data acquisition unit 111, a data division unit 112, a difference data generation unit 113, a data integration unit 114, a data analysis unit 115, and an analysis result output unit 116 in order to perform processing functions in the present embodiment. All of the processing functions of these units are realized by causing the above hardware processor 11a to execute programs stored in the program memory 11b. These processing functions may be realized by using programs provided through a network, not by using the programs stored in the program memory 11b. The data acquisition unit 111 performs a process of acquiring data including a plurality of records from the input device 2 via the input/output interface unit 13, each of the plurality of records including information corresponding to a value of a predetermined feature quantity, external condition identification information for identifying which one of external conditions serving as potential features that affect an occurrence of a predetermined event an external condition according to the record is, and label information indicating whether the record corresponds to data of a positive label indicating that the predetermined event has occurred or data of a negative label indicating that the predetermined event has not occurred, in relation to the value of the predetermined feature quantity according to the record and the external condition according to the record. After that, the data acquisition unit 111 performs a process for storing the acquired data in the acquired data storing unit 121 of the storage unit 12.

The data division unit 112 performs a process of reading the data stored in the acquired data storing unit 121 of the storage unit 12, dividing the read data so as to divide the plurality of records included in the read data by the above external conditions indicated by the external condition identification information, and generating data sets for the respective external conditions. Thereafter, the data division unit 112 performs a process of storing the generated data sets for the respective external conditions in the divided data storing unit 122 of the storage unit 12.

The difference data generation unit 113 performs a process of reading the data sets for the respective external conditions stored in the divided data storing unit 122 of the storage unit 12, dividing records included in each of the read data sets for the respective external conditions according to whether the record corresponds to data of a positive label or data of a negative label, indicated by the above label information, and generating two data sets for the respective label information. Next, for a combination of a record included in one data set of the above two data sets for the respective label information and a record included in the other data set, the difference data generation unit 113 performs a process of generating difference data including a difference between values for respective feature quantities of the predetermined feature quantity according to the respective records and a difference between values indicating whether or not the predetermined event has occurred according to the respective records. Thereafter, the difference data generation unit 113 performs a process of storing the generated difference data in the difference data storing unit 123 of the storage unit 12.

The data integration unit 114 performs a process of reading the above difference data generated for each of the external conditions and stored in the difference data storing unit 123 of the storage unit 12, generating integrated data by combining the read difference data, and storing the generated integrated data in the integrated data storing unit 124 of the storage unit 12.

The data analysis unit 115 performs a process of reading the above integrated data stored in the integrated data storing unit 124 of the storage unit 12, and statistically analyzing the read integrated data. The data analysis unit 115 includes a coefficient vector calculation unit 1151. For example, by using the above difference between the values for the respective feature quantities of the predetermined feature quantity included in the difference data in the integrated data as a value of a predetermined feature quantity of a feature vector and further using the above difference between the values indicating whether or not the predetermined event has occurred included in the difference data as a label indicating whether or not the predetermined event has occurred, the data analysis unit 115 performs in the coefficient vector calculation unit 1151 a process of calculating a regression coefficient vector according to a model for calculating a score value indicating a likelihood of an occurrence of the predetermined event from the above feature vector. The data analysis unit 115 performs a process of storing information of a result obtained by the above statistical analysis, for example information associated with the model or information of the regression coefficient vector, in the analysis result storing unit 125 of the storage unit 12.

The analysis result output unit 116 performs a process of reading the result information obtained by the above statistical analysis stored in the analysis result storing unit 125 of the storage unit 12, and outputting display data of the read information to the display device 3 via the input/output interface unit 13.

(Operation)

Next, the operation of the data processing apparatus 1 configured as described above will be described.

(1) Statistical Analysis Processing based on Business Sales History Data

Figure 3:
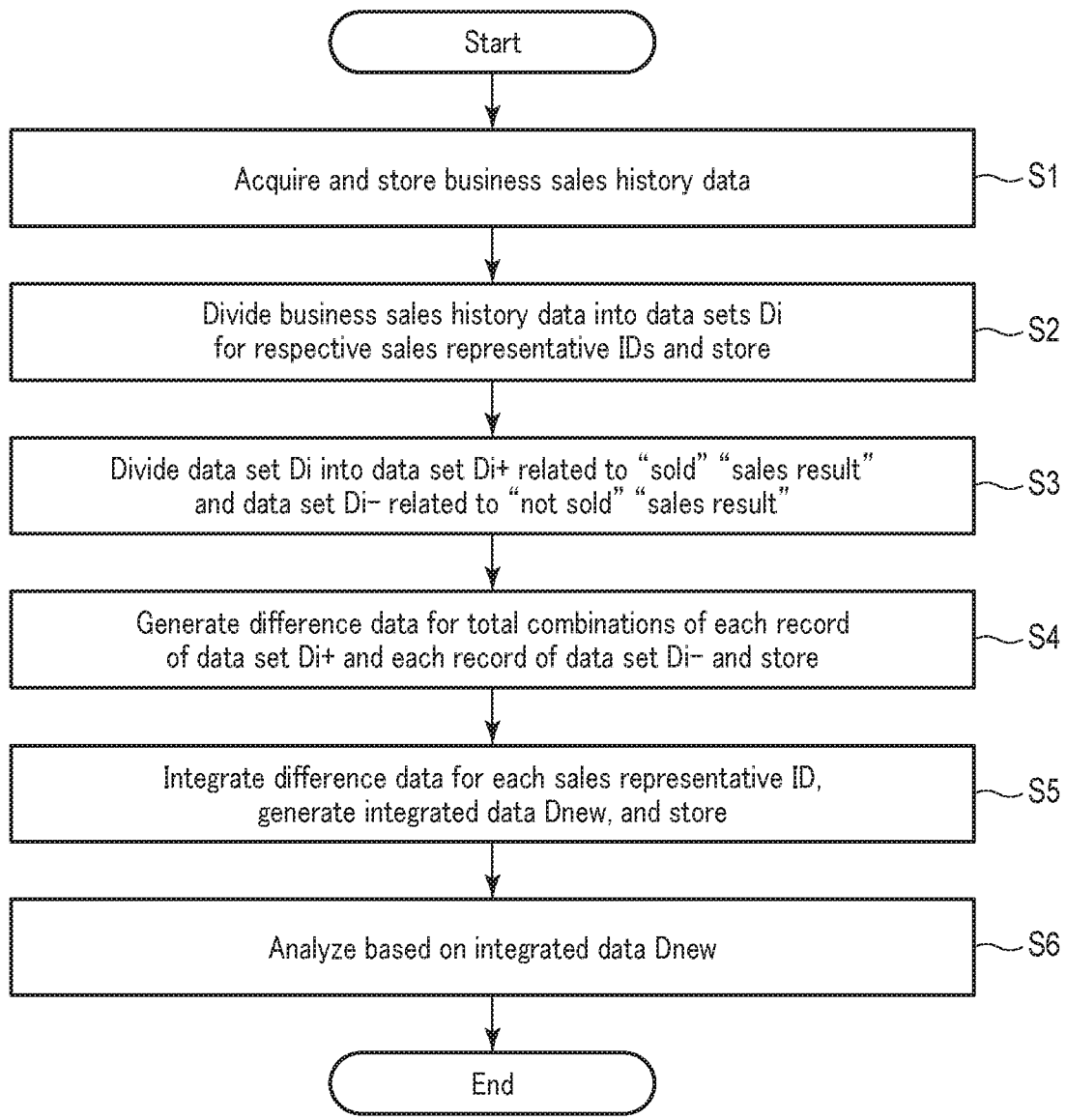
FIG. 3 is a flowchart showing an example of statistical analysis processing based on acquired data performed by a controller unit of the data processing apparatus shown in FIG. 2.

FIG. 3 is a flowchart showing an example of statistical analysis processing based on acquired data, which is performed by the controller unit 11 of the data processing apparatus 1 shown in FIG. 2. In the flowchart, statistical analysis processing based on business sales history data will be described as an example.

First, in step S1, under the control of the data acquisition unit 111, the controller unit 11 acquires business sales history data manually input by an operator, for example, to the input device 2 including a keyboard, a mouse, etc., and stores the acquired business sales history data in the acquired data storing unit 121. The process of acquiring the business sales history data may be performed, for example, by automatic collection using communication. In addition, the data acquisition unit 111 may acquire data by reading data stored in advance in a storage area of the storage unit 12 in step S1.

FIG. 4 is a diagram showing an example of business sales history data of certain merchandise stored in the acquired data storing unit 121.

The business sales history data shown in FIG. 4 includes a plurality of records. Each of the plurality of records includes customer ID information for identifying a customer of a business destination, sales result information indicating a sales result of whether or not a commodity is sold as a result of business activities as label information indicating whether the record corresponds to data of a positive label indicting that a predetermined event has occurred or data of a negative label indicating that the predetermined event has not occurred, sales representative ID information for identifying a person in charge who conducts the business activities as external condition identification information for identifying which one of the external conditions serving as potential features that affect an occurrence of the above predetermined event an external condition according to the record is, and attribute information associated with the customer ID, e.g., the size of staff and the type of business, as information corresponding to a value of a predetermined feature quantity.

Next, in step S2, under the control of the data division unit 112, the controller unit 11 reads the business sales history data stored in the acquired data storing unit 121, divides the business sales history data so as to divide the above plurality of records included in the read business sales history data by the sales representative IDs indicated by the above sales representative ID information, and generates data sets Di for the respective sales representative IDs. Thereafter, under the control of the data division unit 112, the controller unit 11 causes the divided data storing unit 122 to store the generated data sets Di for the respective sales representative IDs.

In the process of generating the data sets for the respective sales representative IDs, for example, first, a unique list L of the sales representative IDs in the above business sales history data is generated, a column indicating information of the sales representative IDs among the above business sales history data is referred to, and the data sets Di for the respective sales representative IDs are generated. In the example of the business sales history data shown in FIG. 4, the business sales history data is divided into a data set in which only records having the sales representative ID of A are collected and a data set in which only records having the sales representative ID of B are collected.

In step S3, under the control of the difference data generation unit 113, the controller unit 11 reads the data sets Di for the respective sales representative IDs stored in the divided data storing unit 122, divides each of the read data sets Di for the respective sales representative IDs so as to divide records included in the data set Di according to whether the above sales result information indicates that the merchandise is sold or not sold, and generates two data sets for the respective sales result information, that is, a data set Di+ of records of sales results in which the merchandise is sold and a data set Di− of records of sales results in which the merchandise is not sold.

In step S4, under the control of the difference data generation unit 113, the controller unit 11 generates difference data for a combination of a record included in the above data set Di+ and a record included in the above data set Di−. Thereafter, under the control of the difference data generation unit 113, the controller unit 11 causes the difference data storing unit 123 to store the difference data generated for each sales representative ID. In the process of generating the difference data, for example, difference data for total combinations between each record included in the above data set Di+ and each record included in the above data set Di− are generated. In the difference data, for example, in all the combinations {c} of each record included in the data set Di+ and each record included in the data set Di−, a feature quantity X and a label Y are defined as follows:

$$(X, Y+)_{ic} = (\{(Di+)-(Di-)\}, 1)_{ic}$$

$$(X, Y-)_{ic} = (\{(Di-)-(Di+)\}, -1)_{ic}$$

Regarding the above attribute information associated with the customer ID and the above sales result information, in a case of quantity data, the difference is obtained by simple subtraction on the quantity data as they are, while in a case of categorical data, the data are deemed to be dummy variables to perform simple subtraction on the dummy variables as they are. In the example of FIG. 4, the feature quantity X corresponds to, for example, information on the size of staff or the type of business as a customer attribute, and the label Y corresponds to, for example, the sales result information (sold/not sold).

In the example of FIG. 4, the information on the size of staff or the type of business as a customer attribute corresponds to the categorical data. Thus, the information on the size of staff or the type of business as a customer attribute is treated as a dummy variable. As for the sales result information, subtraction is performed by, for example, setting "sold" data to "1" and "unsold" data to "0". Since the difference between the "sold" data and the "unsold" data is calculated for each same employee ID, an influence related to potential features peculiar to the employee, e.g., appearance, content of sales talk, and behavior of the employee, that may affect the business performance can be canceled out.

In step S5, under the control of the data integration unit 114, the controller unit 11 reads the above difference data generated for each sales representative ID and stored in the difference data storing unit 123, generates integrated data Dnew by combining the read difference data, and stores the integrated data Dnew in the integrated data storing unit 124.

In the process of generating the integrated data Dnew, for example, all of $(X, Y+)_{ic}$ and $(X, Y-)_{ic}$ generated for each sales representative ID and for combinations of each record included in the data set Di+ and each record included in the data set Di− are merged to generate the above integrated data Dnew for analysis.

In step S6, under the control of the data analysis unit 115, the controller unit 11 reads the above integrated data Dnew stored in the integrated data storing unit 124, and statistically analyzes the read integrated data.

In the above statistical analysis processing, a technique such as correlation analysis, regression analysis, logistic regression analysis, or clustering is selected according to the purpose. A function f (x; W) that outputs a large scalar value when the sales result is "sold" for a feature vector is designed. Here, x represents a feature vector, and W represents a regression coefficient vector corresponding to a feature vector. In the above example, each element of the feature vector x is a feature quantity included in the integrated data Dnew for analysis obtained by combining the difference data. In this embodiment, as the statistical analysis processing, specifically, the coefficient vector calculation unit 1151 performs logistic regression analysis for the purpose of sales results. If the number of variables associated with the customer ID is enormous, variable selection may be performed. For the variable selection, a stepwise method by AIC, Lasso, etc. is applied. A final parameter W can be calculated using a Newton-Raphson method, etc.

After the statistical analysis processing in step S6, under the control of the analysis result output unit 116, the controller unit 11 outputs display data of result information obtained by the statistical analysis to the display device 3.

In the above outputting process, for example, a result of the logistic regression analysis performed under the control of the coefficient vector calculation unit 1151 of the data analysis unit 115 is output. By performing the logistic regression analysis, a regression coefficient vector W in a function f (x; W) that outputs a large scalar value when the sales result is "sold" is output.

(2) Maximization of AUC Value in Statistical Analysis Processing

Hereinafter, the details of the statistical analysis processing performed in step S6 of FIG. 3 will be described.

As an example, the data analysis unit 115 designs a function f (x; W) that outputs a large scalar value in a case of a positive example as a result of input of a feature vector, where x is a feature vector and W is a regression coefficient vector for a feature vector.

When a positive example set is $$D^+ = \{x_i^+\}_{i=1}^{N+}, \qquad \text{[Equation 1]}$$

and a negative example set is $$D^- = \{x_j^-\}_{j=1}^{N-}, \qquad \text{[Equation 2]}$$

an area under the curve (AUC) value based on a receiver operating characteristic (ROC) curve which represents the precision of binary classification can be calculated by the following equation.

$$\overline{AUC} = \frac{1}{N^+N^-}\sum_{i=1}^{N^+}\sum_{j=1}^{N^-} I(f(x_i^+; W) > f(x_j^-; W)), \quad \text{[Equation 3]}$$

provided that $$I(f(x_i^+:W)>f(x_j^-:W)) \quad \text{[Equation 4]}$$

is a step function that outputs 1 when $$f(x_i^+:W)>f(x_i^-:W), \quad \text{[Equation 5]}$$

and outputs 0 in the other cases. When learning is performed only from the labeled data sets D+ and D−, it is preferable to solve an optimization problem of calculating W that maximizes the AUC value.

Accordingly, learning can be easily performed by replacing the above optimization problem with a problem of calculating W that maximizes an objective function ([Equation 8]) set forth below obtained by approximating the step function $$I(f(x_i^+:W)>f(x_j^-:W)) \quad \text{[Equation 6]}$$

by using the sigmoid function $$s(x_i^+, x_j^-; W) = \frac{1}{1+\exp\{-(f(x_i^+; W)-f(x_j^-; W))\}}. \quad \text{[Equation 7]}$$

$$J(W) = \log\left\{\frac{1}{N^+N^-}\sum_{i=1}^{N^+}\sum_{j=1}^{N^-} s(x_i^+, x_j^-; W)\right\} - CR(W) \quad \text{[Equation 8]}$$

R (W) is a regularization term related to the parameter W, and C is a hyper parameter giving a weight of the regularization term. The regularization term is often used to suppress over-learning that reduces the prediction precision for a new sample due to a model excessively fitting to a sample set.

It is possible to maximize the AUC value by using a difference between a data group of a positive label and a data group of a negative label as a feature quantity, as in, as an objective function, $$s(x_i^+, x_j^-; W) = \frac{1}{1+\exp\{-(f(x_i^+; W)-f(x_j^-; W))\}} \quad \text{[Equation 9]}$$

Thus, it is possible to maximize the AUC value by using the difference data generated as described above. A final parameter W can be calculated using a Newton-Raphson method, etc.

In addition, in the data analysis unit 115, the function f (x; W) that outputs a large scalar value in a case of a positive example with respect to a feature vector is designed, but analysis is performed using the data for each sales representative ID in the data processing apparatus 1; therefore, when the sales representative ID is p, a function for obtaining W can be expressed as follows.

$$J(W) = \sum_p J_p(W) + CR(W) \quad \text{[Equation 10]}$$

$$J_p(W) = \sum_{i\_p}\sum_{j\_p} \log s(x_{i\_p}^+, x_{j\_p}^-; W),$$

where a feature vector in the case where the sales result of the sales representative p is "sold" is $$x_{i\_p}^+ \quad \text{[Equation 11]}$$

In addition, a feature vector in the case where the sales result of the sales representative p is "not sold" is $$x_{j\_p}^- \quad \text{[Equation 12]}$$

In this way, by generating combinations for performing pairwise learning for each sales representative, it is possible to eliminate a feature for each sales representative that potentially affects an occurrence of an event, and it is possible to accurately learn the order of companies according to ease of selling to.

R (W) is a regularization term for the parameter W, and C is a hyper parameter giving a weight to the regularization term. The regularization term is often used to suppress over-learning that reduces the prediction accuracy for a new sample due to a model excessively fitting to a sample set.

(3) AUC Value Calculation Processing

As described above, in the statistical analysis processing in the data analysis unit 115, it is possible to increase the value of the AUC value for evaluating the validity of a score value indicating a likelihood of an occurrence of a positive label.

Hereinafter, a method of calculating an AUC value for evaluating the validity of a score value indicating the likelihood of an occurrence of "sold" will be described using the above-described output result W, by giving an example.

The business sales history data used as an example for calculating the parameter W by the statistical analysis processing by the data processing apparatus 1 is data for 1 year in the year of 2016 in which business activities were performed on a certain product, having a data configuration as shown in FIG. 4. At this time, since the dimension of a feature vector exceeded 100, logistic regression analysis to which L2 regularization was applied for the purpose of preventing over-learning was performed. The parameter W was calculated using the Newton-Raphson method.

Using the parameter W calculated in this way, calculation of a predicted value of a "selling" score value to a customer who is an unknown business destination was performed. Here, the predicted value of the score value was calculated by the equation below based on a logistic regression model, using a feature vector associated with a customer who is an unknown business destination and the parameter W calculated as described above.

Since the function f (x; W) obtained by the data analysis unit 115 can be expressed as f (x; W)=t(W)X, score value=1/(1+exp(−(t(W)X))), where t indicates transposition.

As a result, the predicted value of the "selling" score value is associated with a customer ID and a customer attribute associated with the customer ID. An AUC value was used to evaluate the validity of this score value. The larger the AUC value, the more correctly a content is ranked by score in the order from a positive example to a negative example.

As data for evaluating the validity of the predicted value of the score value, business sales history data from April to July 2017 was used. Hereinafter, the business sales history data from April to July 2017 is referred to as evaluation data. A data structure and a sold merchandise of the evaluation data are the same as those of the business sales history data of 2016 used when calculating the parameter W as described above.

In the above evaluation data, a result of "sold" or "not sold" as a sales result of actually performing business activities is associated with information of each customer ID. The evaluation for calculating the AUC value was performed based on the predicted value of the "selling" score value calculated above and whether the result of actually selling was "sold". Specifically, the AUC value was calculated by the following equation:

$$\overline{AUC} = \frac{1}{N^+ N^-} \sum_{i=1}^{N^+} \sum_{j=1}^{N^-} I(f(x_i^+; W) > f(x_j^-; W)), \quad \text{[Equation 13]}$$

provided that $$I(f(x_i^+;W) > f(x_j^-;W)) \quad \text{[Equation 14]}$$

is a step function that outputs 1 when $$f(x_i^+;W) > f(x_j^-;W) \quad \text{[Equation 15]}$$

and outputs 0 in the other cases.

In this way, the AUC value of the L2-type logistic regression model derived as described above was calculated as 0.51.

In order to show the improvement of the AUC value thus calculated using the configuration as shown in FIG. 2, AUC values calculated by two comparison methods are also presented.

A comparison method a targets an L2 regularization-type logistic regression model that can select only valid variables from a large number of variables. This method corresponds to a case where the parameter W is calculated using only the data acquisition unit 111, the acquired data storing unit 121, the data analysis unit 115, and the analysis result output unit 116 shown in FIG. 2. This method fails to take account of a label imbalance between a positive label and a negative label and an influence of a potential feature. In the comparison method a, the AUC value was calculated as 0.42.

A comparison method b corresponds to a case in which the parameter W is obtained by further applying the difference data generation unit 113 and the data integration unit 114 shown in FIG. 2 to the L2 regularization-type logistic regression model of the comparison method a. This method takes account of the label imbalance between a positive label and a negative label, but cannot take account of an influence of a potential feature. In the comparison method b, the AUC value was calculated as 0.39.

As such, it can be seen that the AUC value calculated as described above using the configuration shown in FIG. 2 is improved in comparison with the AUC values calculated in the cases of the comparison methods a and b.

Advantageous Effects (1) Under the control of the data acquisition unit 111, business sales history data including a plurality of records is acquired. Each of the plurality of records includes customer ID information for identifying a customer of a business destination, sales result information indicating a sales result indicating whether or not merchandise is sold as a result of performing business activities, business employee ID information for identifying a person in charge performing the business activities, and attribute information associated with the customer ID, e.g., the size of staff and the type of business. Under the control of the data division unit 112, the above business sales history data is divided so as to divide the above plurality of records included in the business sales history data by the sales employee IDs indicated by the above sales representative ID information, and data sets Di for the respective sales representative IDs are generated. Under the control of the difference data generation unit 113, for each of the data sets Di for the respective sales representative IDs, the data set Di is divided so that the records included in the data set Di are divided according to which one of the merchandise is sold or the merchandise is not sold the sales result information indicates, thereby generating two data sets for the respective sales result information, that is, a data set Di+ of records of the sales result that the merchandise is sold and a data set Di− of records of the sales result that the merchandise is not sold. Further, under the control of the difference data generation unit 113, difference data is generated for a combination of a record included in the above data set Di+ and a record included in the above data set Di−. Under the control of the data integration unit 114, the above generated difference data are combined for each sales representative ID to generate integrated data Dnew. Under the control of the data analysis unit 115, the integrated data Dnew is statistically analyzed.

In this way, the difference data to be used for statistical analysis is generated for a combination between the records included in the two respective data sets Di+ and Di− for the respective sales result information. Thus, it is possible to make combinations when performing pairwise learning substantially equal in condition; therefore, it is possible to solve the problem wherein when the positive label and the negative label are imbalanced, the one of the labels that is rare cannot be predicted with high accuracy. Further, the two data sets for the respective sales result information are generated by dividing the record set Di for each sales representative ID in which records having the same external condition serving as a potential feature that affects a sales result are collected. As such, since the above difference data is generated for the records having the same external condition, the generated difference data can be one from which the influence of the potential feature is eliminated. Furthermore, since the difference data can be generated for various combinations between the records included in the two respective data sets Di+ and Di− for the respective sales result information, a sufficient amount of data for performing statistical analysis can be secured even when explanatory variables cannot be sufficiently collected as samples.

(2) In the statistical analysis processing of the above integrated data under the control of the coefficient vector calculation unit 1151 of the data analysis unit 115, when a model that outputs a large scalar value in the case of a "sold" sales result is derived, a regression coefficient vector according to the model is calculated so that the AUC value based on the ROC curve according to the model is maximized.

The technique described in the document of Nitesh et al. cited above has a problem of a difficulty in optimizing the AUC value based on the ROC curve. However, as described above, in addition to the fact that the statistical analysis can be performed by matching the number of samples of data of the positive label with that of data of the negative label, the AUC value according to the model derived by the statistical analysis can be optimized.

(3) Further, by using the above data processing apparatus according to the first embodiment, it is possible to improve learning efficiency of a data analysis step having a heavy data processing load. Specifically, when the number of data records to be analyzed is the same in the data analysis in the case of using the above data processing apparatus according to the first embodiment and in the data analysis in the case of not using the apparatus, despite the processing load of the data analysis step being the same, it is possible to realize a learning model that enables more accurate prediction in the case of using the above data processing apparatus according to the first embodiment rather than the case of not using the apparatus.

Other Embodiments

Note that the present invention is not limited to the above first embodiment.

For example, in the above first embodiment, an example has been described in which, even in the case where the business style is different for each sales representative and the sales results such as "order reception" and "order cancel" are imbalanced, a statistical model for accurately calculating a predicted value of an order reception score when performing business activities for a certain company in the future is derived by the statistical analysis by the data processing apparatus.

However, the statistical model derived by the data processing apparatus is not limited to the above-described one. In this case, data acquired by the data processing apparatus and to be used for the above statistical analysis after being processed by the data processing apparatus is not the above business sales history data in the first embodiment but must be adapted to a statistical model to be derived.

<Step Score Prediction Using Acceleration Data in Mobile Sensor>

For example, consideration is given to a case where a statistical model for accurately calculating a score for passing through a step is derived from a mobile acceleration sensor in a case where a way of walking is different for each person and a label is imbalanced between a point having a large step and a point having no large step. In this case, it is assumed that a data measurer (user) carries a mobile sensor and walks in the city, and that it is determined whether or not there is a step from the acceleration.

In the data acquisition unit 111, acceleration data is acquired from the acceleration sensor in the mobile sensor carried by the user via a mobile circuit. A sampling interval of the acceleration data is, for example, 100 Hz. As each record stored in the acquired data storing unit 121, information of an ID for identifying a pedestrian (user) as a data measurer, position information indicating a walking position, information indicated by the acceleration data, and information of a correct answer flag indicating whether or not there actually is a step, are stored. That is, in this embodiment, the value of the feature quantity includes the value of the acceleration data of the mobile sensor carried by the user, and the external condition identification information includes the information of the ID for identifying the pedestrian (user). In this embodiment, when the pedestrian (user) actually passes through a step, a positive label indicating that the predetermined event has occurred is given, and when the pedestrian does not pass through the step, a negative label is given.

The data division unit 112 divides the data set by ID for identifying pedestrians who are data measurers. Thereby, a data set Di is generated for each ID for identifying a pedestrian (user) as external condition identification information. In the difference data generation unit 113, for each of the data sets for the respective IDs for identifying pedestrians generated under the control of the data division unit, the data set is divided into a data set Di+ in which only data of "with a step (positive label)" is collected and a data set Di− in which only data of "without a step (negative label)" is collected, and subtraction is performed on total combinations of the records to generate a difference data set. The generated difference data set includes a difference between values of the acceleration data of the acceleration sensor and a difference between values indicating whether or not there is a step (whether or not the pedestrian has actually passed through the step).

In the data integration unit 114, all of the difference data sets generated for the respective IDs for identifying pedestrians under the control of the difference data generation unit are integrated on a record-by-record basis into integrated data Dnew for statistical analysis. The data analysis unit 115 (coefficient vector calculation unit 1151) performs logistic regression analysis for determining whether or not there is a step using the integrated data Dnew. Herein, when the acceleration data is a feature vector x, a parameter W in a function f (x; W) for calculating a score value of having a step is calculated. The feature vector x includes the above difference between the values of the acceleration data as an element. The parameter W includes an element value of a regression coefficient vector. The parameter W can be calculated using the Newton-Raphson method, etc. The analysis result output unit 116 outputs the parameter W calculated under the control of the data analysis unit 115. When acceleration data is measured while walking in an unknown place by using the parameter W calculated in this way, if the acceleration data is a feature vector x, a score value of having a step can be calculated by calculating a score value=$1/(1+\exp(-(t(W)X)))$. Herein, t indicates transposition. This score value can eliminate an influence of a potential feature that is difficult to express as data, such as a way of walking of a measurer, and can take into consideration the imbalance of a step that is a rare event, so that a score value of having a step can be accurately calculated.

<Bad Debt Score Prediction Using Financing Data in Financial Industry>

As an example, consideration is given to a case where, when management strategies vary for each company manager and labels are imbalanced between a case where a bad debt occurs and a case where a bad debt does not occur as a result of a bank financing a company, a statistical model for accurately calculating a bad debt score is derived from information on the company to be financed and information on a manager of the company.

The data acquisition unit acquires data of information on the company to be financed and information on the type of the company manager, which are input through the input device. An input method may be crawling for information from the Web, character recognition from information on paper, or manual input by hand. As each record stored in the acquired data storing unit, information of an ID for identifying a company to be financed, information associated with the company, e.g., the size of staff and the type of business, information of the type of the company manager, e.g., information indicating that the company manager is an autocratic type or a charismatic type, and information of a correct answer flag indicating whether or not a bad debt has actually occurred, are stored. In the data division unit, the data set is divided by the types of the managers of the companies to be financed. The difference data generation unit divides each of the data sets for the respective types of company managers generated under the control of the data division unit into a data set in which only data of "with a bad debt" is collected and a data set in which only data of "without a bad debt" is collected, and performs subtraction on total combinations of the records included in the respective data sets to generate a difference data set. The data integration unit integrates all of the difference data sets generated under the control of the difference data generation unit on a record-by-record basis so as to obtain integrated data for statistical analysis. The data analysis unit performs logistic regression analysis that determines whether or not a bad debt has occurred using the integrated data. Here, assuming that the information (the size of staff, the type of business, etc.) on the company to be financed is a feature vector x, a parameter W in a function f (x; W) for calculating a score value indicating a likelihood of an occurrence of a bad debt is calculated. The parameter W can be calculated using the Newton-Raphson method, etc. The analysis result output unit outputs the parameter W calculated under the control of the data analysis unit.

By using the parameter W calculated in this way, when the information on the company that is a financing candidate is set as the feature vector x, a score value indicating a likelihood of an occurrence of a bad debt can be calculated by calculating the score value=$1/(1+\exp(-(t(W)X)))$, where t indicates transposition. Since this score value can eliminate an influence of a potential feature that is difficult to express as data, such as a management strategy for each type of manager, and can take into consideration the imbalance of occurrences of a bad debt that is a rare event, a score value indicating a likelihood of an occurrence of a bad debt can be calculated accurately.

As described above, the data processing apparatus, method, program, or medium storing the program according to the embodiments described herein include generating difference data. In this difference data generation, a difference between positive example data and negative example data is generated for each potential feature identifier (data having the same potential feature). That is, a hypothesis is set for a potential feature that strongly depends on a likelihood of an occurrence of an event, and data is selected for each identifier having the same potential feature.

In business activity data, in response to an event of "sold/not sold" as a result of the business activity, a skill of a sales representative corresponds to the potential feature, and the potential feature identifier is a sales representative ID. Thus, a difference between the positive example data and the negative example data is generated for each sales representative ID as difference data.

In the acceleration data collected by a person walking with an acceleration sensor, with respect to an event of "with/without a step," a gait of a pedestrian (user) corresponds to the potential feature, and the potential feature identifier is a pedestrian ID. Therefore, a difference between positive example data and negative example data is generated for each pedestrian ID as difference data.

In addition, with respect to an event of "bad debt/no bad debt" as a result of financing a certain company, the type of manager who runs the company corresponds to the potential feature, and the potential feature identifier is a manager ID. Therefore, a difference between positive example data and negative example data is generated for each manager ID as difference data.

As described above, in the various embodiments described herein, in the statistical analysis, the positive example data and the negative example data are selected so as to have the same potential feature strongly dependent on a likelihood of an occurrence of an event, and the difference data is generated. This makes it possible to accurately predict a likelihood of an occurrence of an event in the above statistical analysis, thereby improving learning efficiency.

<Others>

It has been described above that it is possible to eliminate an influence of potential features that are difficult to express as data, such as features dependent on a person (e.g., the way of selling of a sales representative when performing business activities and the way of walking of a person who measures acceleration with a mobile sensor) and features dependent on types (e.g., behavior or the way of thinking that characterizes the type of a company manager (an autocratic type or a charismatic type), such as a management strategy).

However, the potential features can include, for example, a characterizing phenomenon that is difficult to express as data, such as the weather when conducting business activities such as rain or how the wind is blowing. In addition, the configuration of each unit included in the data processing apparatus and the controller unit, the configuration of a record stored in the acquired data storing unit, etc. can be variously modified and implemented without departing from the gist of the present invention.

In short, the present invention is not limited to the above first embodiment as it is, and can be embodied by modifying its structural elements at the implementation stage without departing from the gist thereof. In addition, various inventions can be formed by appropriately combining a plurality of structural elements disclosed in the above first embodiment. For example, some structural elements may be deleted from all the structural elements indicated in the above first embodiment. Furthermore, structural elements of different embodiments may be appropriately combined.

(Notes)

Some or all of the above embodiments can be described as indicated in the following supplementary notes in addition to the claims, but are not limited thereto.

(Note 1)

A data processing apparatus (1) comprising: a data division unit (112) that divides a plurality of acquired records based on external condition identification information included in each of the records, the external condition identification information being for identifying which one of external conditions serving as potential features that affect an occurrence of a predetermined event an external condition according to the record is, to generate data sets for the respective external conditions;

a difference data generation unit (113) that divides, for each of the generated data sets for the respective external conditions, records included in the data set based on label information included in the record, the label information indicating whether the record corresponds to a positive label indicating that the predetermined event has occurred or a negative label indicating that the predetermined event has not occurred to generate two data sets for the respective label information, and generates difference data for a combination of a record included in one data set of the two data sets for the respective label information and a record included in the other data set; and a data analysis unit (115) that performs statistical analysis using the difference data generated by the difference data generation unit (113).

(Note 2)

A data processing apparatus (1) for calculating a regression coefficient vector according to a model for calculating a score value indicating a likelihood of an occurrence of a predetermined event from a feature vector having a value of a predetermined feature quantity as an element, the data processing apparatus comprising:

a data acquisition unit (111) that acquires a plurality of records each including information corresponding to the value of the predetermined feature quantity, external condition identification information for identifying which one of external conditions serving as potential features that affect the occurrence of the predetermined event an external condition according to the record is, and label information indicating whether the record corresponds to data of a positive label in which the predetermined event has occurred or data of a negative label in which the predetermined event has not occurred, in relation to the value of the predetermined feature quantity according to the record and the external condition according to the record;

a data division unit (112) that divides the acquired records by the external conditions indicated by the external condition identification information to generate data sets for the respective external conditions;

a difference data generation unit (113) that, for each of the generated data sets for the respective external conditions, divides records included in the data set according to whether the record corresponds to the data of the positive label or the data of the negative label indicated by the label information to generate two data sets for the respective label information, and generates, for a combination of a record included in one data set of the two data sets for the respective label information and a record included in the other data set, difference data including a difference of values for feature quantities of the predetermined feature quantity according to the respective records and a difference of values indicating whether or not the predetermined event has occurred according to the respective records; and a coefficient vector calculation unit (1151) that calculates the regression coefficient vector by using the difference of the values for the respective feature quantities of the predetermined feature quantity included in the difference data generated by the difference data generation unit (113) as a value of the predetermined feature quantity of the feature vector according to the model, and further using the difference of the values indicating whether or not the predetermined event has occurred included in the difference data as a label indicating whether or not the predetermined event has occurred according to the model.

(Note 3)

The data processing apparatus (1) according to claim 2, wherein the coefficient vector calculation unit (1151) calculates the regression coefficient vector so that an area under the curve (AUC) value based on a receiver operating characteristic (ROC) curve according to the model is maximized.

(Note 4)

A data processing method executed by an apparatus comprising a hardware processor and a memory, the method comprising:

dividing a plurality of acquired records based on external condition identification information included in each of the records, the external condition identification information being for identifying which one of external conditions serving as potential features that affect an occurrence of a predetermined event an external condition according to the record is, to generate data sets for the respective external conditions;

dividing, for each of the generated data sets for the respective external conditions, records included in the data set based on label information included in the record, the label information indicating whether the record corresponds to a positive label indicating that the predetermined event has occurred or a negative label indicating that the predetermined event has not occurred to generate two data sets for the respective label information, and generating difference data for a combination of a record included in one data set of the two data sets for the respective label information and a record included in the other data set; and performing statistical analysis using the difference data generated by the difference data generating step.

(Note 5)

A data processing method for calculating a regression coefficient vector according to a model for calculating a score value indicating a likelihood of an occurrence of a predetermined event from a feature vector having a value of a predetermined feature quantity as an element, executed by an apparatus comprising a hardware processor and a memory, the method comprising:

acquiring a plurality of records each including information corresponding to the value of the predetermined feature quantity, external condition identification information for identifying which one of external conditions serving as potential features that affect the occurrence of the predetermined event an external condition according to the record is, and label information indicating whether the record corresponds to data of a positive label in which the predetermined event has occurred or data of a negative label in which the predetermined event has not occurred, in relation to the value of the predetermined feature quantity according to the record and the external condition according to the record;

dividing the acquired records by the external conditions indicated by the external condition identification information to generate data sets for the respective external conditions;

for each of the generated data sets for the respective external conditions, dividing records included in the data set according to whether the record corresponds to the data of the positive label or the data of the negative label indicated by the label information to generate two data sets for the respective label information, and generating, for a combination of a record included in one data set of the two data sets for the respective label information and a record included in the other data set, difference data including a difference of values for feature quantities of the predetermined feature quantity according to the respective records and a difference of values indicating whether or not the predetermined event has occurred according to the respective records; and calculating the regression coefficient vector by using the difference of the values for the respective feature quantities of the predetermined feature quantity included in the difference data generated by the difference data generating step as a value of the predetermined feature quantity of the feature vector according to the model, and further using the difference of the values indicating whether or not the predetermined event has occurred included in the difference data as a label indicating whether or not the predetermined event has occurred according to the model.

(Note 6)

A program for causing a hardware processor to function as each unit included in the data processing apparatus (1) according to any one of claims 1 to 3.

(Note 7)

A data structure of a record used by a data processing apparatus (1) for performing statistical analysis, comprising:
external condition identification information for identifying which one of external conditions serving as potential features that affect an occurrence of a predetermined event an external condition according to the record is; and
label information indicating whether the record corresponds to a positive label indicating that the predetermined event has occurred or a negative label indicating that the predetermined event has not occurred,
wherein the data structure is used by the data processing apparatus (1) to
divide a plurality of records including the data structure based on the external condition identification information to generate data sets for the respective external conditions;
divide, for each of the generated data sets for the respective external conditions, records included in the data set based on the label information to generate two data sets for the respective label information, and generate difference data for a combination of a record included in one data set of the two data sets for the respective label information and a record included in the other data set; and
perform statistical analysis using the generated difference data.

(Notes 8)

A data structure of a record used by a data processing apparatus (1) for calculating a regression coefficient vector according to a model for calculating a score value indicating a likelihood of an occurrence of a predetermined event from a feature vector having a value of a predetermined feature quantity as an element, the data structure comprising:
information corresponding to the value of the predetermined feature quantity;
external condition identification information for identifying which one of external conditions serving as potential features that affect an occurrence of the predetermined event an external condition according to the record is; and
label information indicating whether the record corresponds to data of a positive label in which the predetermined event has occurred or data of a negative label in which the predetermined event has not occurred, in relation to the value of the predetermined feature quantity according to the record and the external condition according to the record,
wherein the record is used by the data processing apparatus (1) to
divide a plurality of records including the data structure by the external conditions indicated by the external condition identification information to generate data sets for the respective external conditions,
divide, for each of the generated data sets for the respective external conditions, records included in the data set according to whether the record corresponds to the data of the positive label or the data of the negative label indicated by the label information to generate two data sets for the respective label information, and generate, for a combination between a record included in one data set of the two data sets for the respective label information and a record included in the other data set, difference data including a difference of values for respective feature quantities of the predetermined feature quantity according to the respective records and a difference of values indicating whether or not the predetermined event has occurred according to the respective records, and
calculate the regression coefficient vector by using the difference of the values for the respective feature quantities of the predetermined feature quantity included in the generated difference data as a value of the predetermined feature quantity of the feature vector according to the model, and further using the difference of the values indicating whether or not the predetermined event has occurred included in the difference data as a label indicating whether or not the predetermined event has occurred according to the model.

REFERENCE SIGNS LIST

1: data processing apparatus, 11: controller unit, 111: data acquisition unit, 112: data division unit, 113: difference data generation unit, 114: data integration unit, 115: data analysis unit, 116: analysis result output unit, 12: storage unit, 121: acquired data storing unit, 122: divided data storing unit, 123: difference data storing unit, 124: integrated data storing unit, 125: analysis result storing unit, 13: input/output interface unit, 2: input device, 3: display device

The invention claimed is:

1. A data processing apparatus, comprising
a processor configured to:
acquire data including a plurality of records, the data including acceleration data acquired from an acceleration sensor of a mobile sensor;
first divide the records of the acquired data based on external condition identification information included in each of the records, the external condition identification information identifying which of a plurality of external conditions serves as potential features that affects whether or not a predetermined event occurs, the first division of the records generating data sets for the respective external conditions, and the predetermined event being a user passing through a step as indicated by the acceleration data;
second divide, for each of the generated data sets for the respective external conditions, records included in the data set based on label information included in each of the records, the label information indicating whether the record corresponds to a positive label indicating that the predetermined event has occurred or a negative label indicating that the predetermined event has not occurred, the second division generating two data sets for the respective label information, the positive label indicating that the predetermined event has occurred and that the user has passed through a step and the negative label indicating that the predetermined event has not occurred and that the user has not passed through a step;
generate a difference between a first record included in one data set of the two data sets for the respective label information and a second record included in another data set of the two data sets as difference data, wherein the difference data includes a difference of values for respective feature quantities of the predetermined feature quantity according to the respective records and a difference of values indicating whether or not the predetermined event has occurred according to the respective records;
perform statistical analysis using the generated difference data; and visually output a result of performing the statistical analysis on a display device; and a memory for storing instructions for operating the processor, wherein each of the records of the acquired data further includes information corresponding to a value of a predetermined feature quantity, and performing the statistical analysis includes calculating a regression coefficient vector according to a model for calculating a score value indicating a likelihood of an occurrence of the predetermined event by using the difference of the values for the respective feature quantities of the predetermined feature quantity included in the difference data as an element of a feature vector and using the difference of the values indicating whether or not the predetermined event has occurred included in the difference data as a label indicating whether or not the predetermined event has occurred according to the model, wherein the processor is further configured to perform learning by adjusting one or more parameters of the statistical analysis based on calculating the regression coefficient vector that maximizes an objective function by approximating a step function using a sigmoid function.

2. The data processing apparatus according to claim 1, wherein calculating the regression coefficient vector according to the model comprises calculating the regression coefficient vector so that an area under the curve (AUC) value based on a receiver operating characteristic (ROC) curve according to the model is maximized.

3. A data processing apparatus, comprising
a processor configured to:
  acquire data including a plurality of records, the data including acceleration data acquired from an acceleration sensor of a mobile sensor;
  first divide the records of the acquired data based on external condition identification information included in each of the records, the external condition identification information identifying which of a plurality of external conditions serves as potential features that affects whether or not a predetermined event occurs, the first division of the records generating data sets for the respective external conditions, and the predetermined event being a user passing through a step as indicated by the acceleration data;
  second divide, for each of the generated data sets for the respective external conditions, records included in the data set based on label information included in each of the records, the label information indicating whether the record corresponds to a positive label indicating that the predetermined event has occurred or a negative label indicating that the predetermined event has not occurred, the second division generating two data sets for the respective label information;
  generate a difference between a first record included in one data set of the two data sets for the respective label information and a second record included in another data set of the two data sets as difference data, wherein the difference data includes a difference of values for respective feature quantities of the respective records and a difference of values indicating whether or not the predetermined event has occurred according to the respective records;
  perform statistical analysis using the generated difference data; and visually output a result of performing the statistical analysis on a display device; and a memory for storing instructions for operating the processor, wherein each of the records of the acquired data further includes an ID for identifying the user as the external condition identification information, a positive label indicating that the predetermined event has occurred indicates that the user has passed through a step, and a negative label indicating that the predetermined event has not occurred indicates that the user has not passed through the step, the difference data further includes a difference of values of the acceleration data according to the respective records, and performing the statistical analysis includes calculating a regression coefficient vector according to a model for calculating a score value indicating whether or not the user has passed through a step, by using the difference of the values of the acceleration data included in the difference data as an element of a feature vector and using the difference of the values indicating whether or not the user has passed through the step as a label indicating whether or not the user has passed through the step according to the model, and performing learning by adjusting one or more parameters of the statistical analysis based on calculating the regression coefficient vector that maximizes an objective function by approximating a step function using a sigmoid function.

4. The data processing apparatus according to claim 3, wherein calculating the regression coefficient vector according to the model comprises calculating the regression coefficient vector so that an area under the curve (AUC) value based on a receiver operating characteristic (ROC) curve according to the model is maximized.

5. A data processing method executed by an apparatus comprising a hardware processor and a memory, the method comprising:
  acquiring data including a plurality of records, the data including acceleration data acquired from an acceleration sensor of a mobile sensor;
  first dividing the records of the acquired data based on external condition identification information included in each of the records, the external condition identification information identifying which of a plurality of external conditions serves as potential features that affects whether or not a predetermined event occurs, the first dividing the records generating data sets for the respective external conditions, and the predetermined event being a user passing through a step as indicated by the acceleration data;
  second dividing, for each of the generated data sets for the respective external conditions, records included in the data set based on label information included in each of the records, the label information indicating whether the record corresponds to a positive label indicating that the predetermined event has occurred or a negative label indicating that the predetermined event has not occurred, the second dividing generating two data sets for the respective label information, the positive label indicating that the predetermined event has occurred and that the user has passed through a step, and the negative label indicating that the user has not passed through a step;
  generating a difference between a first record included in one data set of the two data sets for the respective label information and a second record included in another data set of the two data sets as difference data, wherein the difference data includes a difference of values for respective feature quantities of the respective records and a difference of values indicating whether or not the predetermined event has occurred according to the respective records;

performing statistical analysis using the generated difference data; and visually outputting a result of performing the statistical analysis on a display device, wherein each of the acquired records further includes information corresponding to a value of a predetermined feature quantity, performing the statistical analysis includes calculating a regression coefficient vector according to a model for calculating a score value indicating a likelihood of an occurrence of the predetermined event by using the difference of the values for the respective feature quantities of the predetermined feature quantity included in the difference data as an element of a feature vector and using the difference of the values indicating whether or not the predetermined event has occurred included in the difference data as a label indicating whether or not the predetermined event has occurred according to the model, and performing learning by adjusting one or more parameters of the statistical analysis based on calculating the regression coefficient vector that maximizes an objective function by approximating a step function using a sigmoid function.

6. The data processing method according to claim 5, wherein calculating the regression coefficient vector according to the model comprises calculating the regression coefficient vector so that an area under the curve (AUC) value based on a receiver operating characteristic (ROC) curve according to the model is maximized.

7. A data processing method executed by an apparatus comprising a hardware processor and a memory, the method comprising:

acquiring data including a plurality of records, the data including acceleration data acquired from an acceleration sensor of a mobile sensor;

first dividing the records of the acquired data based on external condition identification information included in each of the records, the external condition identification information identifying which of a plurality of external conditions serves as potential features that affects whether or not a predetermined event occurs, the first dividing the records generating data sets for the respective external conditions, and the predetermined event being a user passing through a step as indicated by the acceleration data;

second dividing, for each of the generated data sets for the respective external conditions, records included in the data set based on label information included in each of the records, the label information indicating whether the record corresponds to a positive label indicating that the predetermined event has occurred or a negative label indicating that the predetermined event has not occurred, the second dividing generating two data sets for the respective label information;

generating a difference between a first record included in one data set of the two data sets for the respective label information and a second record included in another data set of the two data sets as difference data, wherein the difference data includes a difference of values for respective feature quantities of the respective records and a difference of values indicating whether or not the predetermined event has occurred according to the respective records;

performing statistical analysis using the generated difference data; and visually outputting a result of performing the statistical analysis on a display device, wherein each of the records of the acquired data further includes an ID for identifying the user as the external condition identification information, a positive label indicating that the predetermined event has occurred indicates that the user has passed through a step, and a negative label indicating that the predetermined event has not occurred indicates that the user has not passed through the step, the difference data further includes a difference of values of the acceleration data according to the respective records, performing the statistical analysis includes calculating a regression coefficient vector according to a model for calculating a score value indicating whether or not the user has passed through a step, by using the difference of the values of the acceleration data included in the difference data as an element of a feature vector and using the difference of the values indicating whether or not the user has passed through the step as a label indicating whether or not the user has passed through the step according to the model, and performing learning by adjusting one or more parameters of the statistical analysis based on calculating the regression coefficient vector that maximizes an objective function by approximating a step function using a sigmoid function.

8. The data processing method according to claim 7, wherein calculating the regression coefficient vector according to the model comprises calculating the regression coefficient vector so that an area under the curve (AUC) value based on a receiver operating characteristic (ROC) curve according to the model is maximized.

9. A non-transitory tangible computer-readable storage medium storing instructions for causing a processor to:

acquire data including a plurality of records, the data including acceleration data acquired from an acceleration sensor of a mobile sensor;

first divide the records of the acquired data based on external condition identification information included in each of the records, the external condition identification information identifying which of a plurality of external conditions serves as potential features that affects whether or not a predetermined event occurs, the first division of the records generating data sets for the respective external conditions, and the predetermined event being a user passing through a step as indicated by the acceleration data;

second divide, for each of the generated data sets for the respective external conditions, records included in the data set based on label information included in each of the records, the label information indicating whether the record corresponds to a positive label indicating that the predetermined event has occurred or a negative label indicating that the predetermined event has not occurred, the second division generating two data sets for the respective label information, the positive label indicating that the user has passed through a step and the negative label indicating that the user has not passed through a step;

generate a difference between a first record included in one data set of the two data sets for the respective label information and a second record included in another data set of the two data sets as difference data, wherein the difference data includes a difference of values for respective feature quantities of the respective records and a difference of values indicating whether or not the predetermined event has occurred according to the respective records;

perform statistical analysis using the generated difference data; and visually output a result of performing the statistical analysis on a display device, wherein each of the records of the acquired data further includes information corresponding to a value of a predetermined feature quantity, performing the statistical analysis includes calculating a regression coefficient vector according to a model for calculating a score value indicating a likelihood of an occurrence of the predetermined event by using the difference of the values for the respective feature quantities of the predetermined feature quantity included in the difference data as an element of a feature vector and using the difference of the values indicating whether or not the predetermined event has occurred included in the difference data as a label indicating whether or not the predetermined event has occurred according to the model, and perform learning by adjusting one or more parameters of the statistical analysis based on calculating the regression coefficient vector that maximizes an objective function by approximating a step function using a sigmoid function.

10. The computer-readable storage medium according to claim 9, wherein calculating the regression coefficient vector according to the model comprises calculating the regression coefficient vector so that an Area Under the Curve (AUC) value based on a Receiver Operating Characteristic (ROC) curve according to the model is maximized.

11. A non-transitory tangible computer-readable storage medium storing instructions for causing a processor to:

acquire data including a plurality of records, the data including acceleration data acquired from an acceleration sensor of a mobile sensor;

first divide the records of the acquired data based on external condition identification information included in each of the records, the external condition identification information identifying which of a plurality of external conditions serves as potential features that affects whether or not a predetermined event, the first division of the records generating data sets for the respective external conditions, and the predetermined event being a user passing through a step as indicated by the acceleration data;

second divide, for each of the generated data sets for the respective external conditions, records included in the data set based on label information included in each of the records, the label information indicating whether the record corresponds to a positive label indicating that the predetermined event has occurred or a negative label indicating that the predetermined event has not occurred, the second division generating two data sets for the respective label information;

generate a difference between a first record included in one data set of the two data sets for the respective label information and a second record included in another data set of the two data sets as difference data, wherein the difference data includes a difference of values for respective feature quantities of the respective records and a difference of values indicating whether or not the predetermined event has occurred according to the respective records;

perform statistical analysis using the generated difference data; and visually output a result of performing the statistical analysis on a display device, wherein each of the records of the acquired data further includes an ID for identifying the user as the external condition identification information, a positive label indicating that the predetermined event has occurred indicates that the user has passed through a step, and a negative label indicating that the predetermined event has not occurred indicates that the user has not passed through the step, the difference data further includes a difference of values of the acceleration data according to the respective records, and perform the statistical analysis includes calculating a regression coefficient vector according to a model for calculating a score value indicating whether or not the user has passed through a step, by using the difference of the values of the acceleration data included in the difference data as an element of a feature vector and using the difference of the values indicating whether or not the user has passed through the step as a label indicating whether or not the user has passed through the step according to the model, and perform learning by adjusting one or more parameters of the statistical analysis based on calculating the regression coefficient vector that maximizes an objective function by approximating a step function using a sigmoid function.

12. The computer-readable storage medium according to claim 11, wherein calculating the regression coefficient vector according to the model comprises calculating the regression coefficient vector so that an Area Under the Curve (AUC) value based on a Receiver Operating Characteristic (ROC) curve according to the model is maximized.

* * * * *